(12) United States Patent
Morris

(10) Patent No.: US 6,353,848 B1
(45) Date of Patent: Mar. 5, 2002

(54) METHOD AND SYSTEM ALLOWING A CLIENT COMPUTER TO ACCESS A PORTABLE DIGITAL IMAGE CAPTURE UNIT OVER A NETWORK

(75) Inventor: Robert P. Morris, Raleigh, NC (US)

(73) Assignee: FlashPoint Technology, Inc., Peterborough, NH (US)

(*) Notice: Subject to any disclaimer, the term of this patent is extended or adjusted under 35 U.S.C. 154(b) by 0 days.

(21) Appl. No.: 09/127,514

(22) Filed: Jul. 31, 1998

(51) Int. Cl.$^7$ .............................................. G06F 15/16
(52) U.S. Cl. .................. 709/203; 709/200; 709/202; 709/217; 709/219; 709/228; 709/232; 709/245
(58) Field of Search ................................. 709/200–203, 709/206, 217–219, 227–229, 231–232, 236–237, 245; 707/10, 200–204; 713/201–202

(56) References Cited

U.S. PATENT DOCUMENTS

| | | | | |
|---|---|---|---|---|
| 5,911,044 A | * | 6/1999 | Lo et al. | 709/203 |
| 6,018,774 A | * | 1/2000 | Mayle et al. | 709/203 |
| 6,058,428 A | * | 5/2000 | Wang et al. | 709/232 |
| 6,085,249 A | * | 7/2000 | Wang et al. | 709/229 |
| 6,101,536 A | * | 8/2000 | Kotani et al. | 709/217 |
| 6,141,759 A | * | 10/2000 | Braddy | 709/203 |

FOREIGN PATENT DOCUMENTS

DE 198 08 616 9/1998 .......... H04L/12/16

OTHER PUBLICATIONS

De Albuquerque et al., "Remote Monitoring Over The Internet", Nuclear Instruments & Methods In Physics Research, Section–A: Accelerators, Spectrometers, Detectors and Associated Equipment, vol. 412, No. 1, Jul. 21, 1998, pp. 140–145.

* cited by examiner

Primary Examiner—Zarni Maung
Assistant Examiner—Bharat Barot
(74) Attorney, Agent, or Firm—Sawyer Law Group LLP

(57) ABSTRACT

A method for accessing a digital image capture unit via a communication network comprising a server computer system and a client computer system communicatively coupled with communication equipment. In one embodiment, the address of the digital image capture unit is registered in an executable program on the server computer system. The executable program is accessed by the client computer system. The executable program connects the digital image capture unit and the server computer system. The executable program communicates commands between the client computer system and the digital image capture unit, such that data captured by the digital image capture unit is transferred to the client computer system via the server computer system.

27 Claims, 11 Drawing Sheets

METHOD AND SYSTEM ALLOWING A CLIENT COMPUTER TO ACCESS A PORTABLE DIGITAL IMAGE CAPTURE UNIT OVER A NETWORK

FIELD OF THE INVENTION

The field of the present invention pertains to digital image capture devices. More particularly, the present invention relates to a method for remotely accessing a digital camera via a communication network.

BACKGROUND OF THE INVENTION

Modern digital cameras typically include an imaging device which is controlled by a computer system running a software program. When an image is captured, the imaging device is exposed to light and generates raw image data representing the image. The raw image data are typically stored in an image buffer, where they are processed and compressed by the computer system's processor. Many types of compression schemes can be used to compress the image data, such as the joint photographic expert group (JPEG) standard. After the processor processes and compresses the raw image data into image files, the processor stores the image files in an internal memory or on an external memory card.

Some digital cameras are also equipped with a liquid-crystal display (LCD) or another type of display screen on the back of the camera. Through the use of the LCD, the processor can cause the digital camera to operate in one of two modes, play and record, although some cameras only have a record mode. In the play mode, the LCD is used as a playback screen allowing the user to review previously captured images either individually or in arrays of four, nine, or sixteen images. In the record mode, the LCD is used as a viewfinder through which the user may view an object or scene before taking a picture.

Besides the LCD, user interfaces for digital cameras also include a number of buttons or switches for setting the camera into one of the two modes and for navigating between images in play mode. For example, most digital cameras include two buttons, labeled "−" and "+," that enable a user to navigate or scroll through captured images. For example, if the user is reviewing images individually, then pressing one of navigation buttons causes the currently displayed image to be replaced by the next image.

A digital camera has no film and, as such, there is no incremental cost of taking and storing pictures. Hence, it is possible to take an unlimited number of pictures, wherein the most recent picture replaces the earliest picture, for virtually zero incremental cost. Accordingly, this advantage is best realized when the camera is used as much as possible, taking pictures of practically anything of interest.

One way to best utilize this unique attribute is to make the digital camera and its internally stored images remotely accessible. If the pictures are remotely accessible, the camera could be set to continuously take pictures of scenes and items of interest. Ideally, a user would be able to access those pictures at any time. The user would be able to use a widely available communications medium to access the camera from virtually an unlimited number of locations.

The emergence of the Internet as a distributed, widely accessible communications medium provides a convenient avenue for implementing remote accessibility. Providing remote accessibility via the Internet leverages the fact that the Internet is becoming familiar to an increasing number of people. Many users have become accustomed to retrieving information from remotely located systems via the Internet. There are many and varied applications which presently use the Internet to provide remote access or remote connectivity. Internet telephony is one such application, such as Microsoft's NetMeeting and Netscape's CoolTalk.

NetMeeting and CoolTalk are both real-time desktop audio conferencing and data collaboration software applications specifically designed to use the Internet as their communications medium. Both software applications allow a "local" user to place a "call" to a "remote" user located anywhere in the world. With both NetMeeting and CoolTalk, the software application is hosted on a personal computer system at the user's location and on a personal computer system at the remote user's location. Both NetMeeting and CoolTalk require a SLIP (Serial Line Internet Protocol) or PPP (Point-to-Point Protocol) account where Internet access is via a dial-up modem, and where the user, as is typical, accesses the Internet through an ISP (Internet Service Provider). Both NetMeeting and CoolTalk require personal computer systems for the resources necessary to run these applications (e.g., processing power, memory, communications hardware, and the like). In addition, both NetMeeting and CoolTalk require the one user to input an IP (Internet Protocol) address for the other user in order to establish communication between the users.

To facilitate the process of obtaining appropriate Internet addresses, CoolTalk, for example, allows on-line users to list their respective IP addresses with a proprietary CoolTalk central Web server. This allows a user to obtain a list of users currently on-line to whom communication can be established. Upon locating the desired remote user in the Internet address list maintained by the Web server, the local user places the call.

In this manner, the proprietary CoolTalk Web server maintains a user-viewable and user-updated "address book" in which users list their respective Internet addresses and in which they search for the Internet addresses of others with whom they wish to communicate. However, both NetMeeting and CoolTalk require active user input, in that each require the user to input his current Internet address, and in that each require the local user to search the address book for the Internet address of the remote user to be contacted. This can be quite problematic in the case where users obtain access to the Internet via dial-up connections and hence have different Internet addresses each time their respective dial-up connections are established.

In a manner similar to Internet telephony, Internet desktop video conferencing is another prior art application which uses the Internet as its communications medium. One such application, for example, is CU-SeeMe by White Pine. CU-SeeMe provides real time video conferencing between two or more users. As with NetMeeting and CoolTalk, CU-SeeMe is a software application which runs on both the local user's personal computer system and the remote user's personal computer system. The personal computer systems provide the resources for running the application. As with NetMeeting and CoolTalk, CU-SeeMe requires the local user to enter the IP address of the remote user. Like CoolTalk, CU-SeeMe facilitates this process by allowing on-line users to list their respective IP addresses with a proprietary central Web server such that the addresses can be easily indexed and searched.

Another prior art example of remote access via the Internet is status queries of remote devices using the Internet as the communications medium. A typical prior art application involves interfacing a remote device with a computer system, and accessing the computer system via the Internet. For example, a vending machine can be remotely accessed to determine its status (e.g., the number of sales made, whether the machine needs refills, whether the machine needs maintenance, and the like). The machine is appropriately equipped with sensors, switches, and the like, which in turn are interfaced to a computer system using a software driver. The computer system is coupled to the Internet and interfaces with the machine through the driver, making the relevant information available over the Internet using Web server software. Hence, any interested user (e.g., the vending machine service company) is able to remotely ascertain the status of the machine via the Internet.

A problem with the above described prior art applications is that access to the Internet and communication thereon require a separate host computer system (e.g., a personal computer system) on each side of the Internet connection in addition to the server computer system on the Internet. The two host computer systems provide the computational resources to host the respective software applications, the Internet access software, and any necessary device drivers. The required computational resources consume a significant amount of memory. Because of this, among other reasons, the above prior art applications are not easily transferred to the realm of easy-to-use, intuitive, consumer electronic devices such as digital cameras, which are small in size and so generally constrained by the amount of memory they can house. In addition, a consumer electronic device such as a digital camera that requires a separate computer system would be more expensive and complex, and therefore would not be consistent with the desire of consumers for lower cost and simpler devices.

Also, separate host computer systems (where the host computer systems host the software and drivers required by prior art applications as described above) require extra effort to administer, particularly with regard to networks consisting of a large number of computer systems (e.g., digital cameras each incorporating a computer system). For example, an upgrade to the software residing on each computer system has to be individually installed on each computer system. Also, each computer system has to be individually polled to query whether the computer system has data of interest to the user, and then the data have to be separately accessed and collected from each computer system, then compiled. For example, in an application involving digital cameras, a user may be interested in finding out which digital cameras have images in storage. In the prior art, the user has to access each digital camera individually. In another case, a user may have an interest in maintaining a record of transactions between all users and all digital cameras. Again, in the prior art this is accomplished by individually accessing each digital camera (or, alternatively, each user's computer system) to collect the data, and then compiling the complete list of transactions.

Another problem with the prior art is the fact that the applications described above require the user to know the Internet address of the person or device that is being contacted. The Internet telephony applications (e.g., CoolTalk) often employ a user-viewable and user-updated address book to facilitate the process of locating and obtaining the correct Internet address; however, they require active user input. This is difficult in the case where users obtain access to the Internet via dial-up connections, and thus have changing Internet addresses. Still another problem with the prior art is that the applications described above provide only a limited degree of functionality; that is, they are limited to either chat, video conferencing, or the like. As such, they are not capable of establishing a connection between any type of user system and remote device.

One prior art system is described in the copending previously filed patent application, assigned to the assignee of the present invention, entitled "A Method and System for Hosting an Internet Web Site on a Digital Camera," Eric C. Anderson and others, Ser. No. 09/044,644. This prior art system presents one solution to the problem of gaining remote access to those digital devices where the location and Internet address of the device are highly changeable. This prior art system incorporates a Web server into the digital device, specifically a digital camera. However, the disadvantage to this prior art system is that the Web server consumes valuable memory and computational resources in the digital camera. In addition, because of the limited memory in a device such as a digital camera, the Web server is not as powerful as a Web server on a server computer system.

Thus, a need exists for an inexpensive and powerful method for implementing remote access to digital devices, such as digital cameras, where the location and Internet address of the device are highly changeable. A further need exists for an intuitive, simple protocol for presenting the device's functionality and capabilities to users. In addition, a need exists for a method of efficiently administering a plurality of separate devices. A need also exists for an efficient process of obtaining the address of the device that is transparent to the viewer. The present invention provides a novel solution to the above needs.

SUMMARY OF THE INVENTION

The present invention provides an inexpensive and powerful method for implementing remote access to digital devices, such as digital cameras, where the location and Internet address of the device are highly changeable. The present invention further provides an intuitive, simple protocol for presenting the device's functionality and capabilities to users. In addition, the present invention provides a method of efficiently administering a plurality of separate devices. The present invention also provides an efficient process of obtaining the address of a device that is transparent to the user.

In one embodiment, the present invention is an executable program for accessing a digital camera via a communication network using a Web server on a server computer system and a Web browser (or a program of similar function) on a client computer system that are communicatively coupled via the Internet. The address of the digital camera is registered in an executable program on the server computer system. The executable program is accessed by the client computer system. The executable program connects the digital camera and the server computer system. The executable program enables the client computer system and the digital camera to communicate using any protocol used by these devices, thus allowing data (e.g., images) acquired by the digital camera to be transferred to the client computer system.

The executable program can be implemented in a variety of forms. For example, the executable program can be a Java servlet. Alternatively, the executable program can be a cgi-bin (Common Gateway Interface-binaries).

For example, in the case of a digital camera, the executable program directly communicates commands from the client computer system to the digital camera when both the client computer system and the digital camera are on-line at the same time. Alternatively, if the digital camera is not on-line, the commands from the client computer system are first stored in the server computer system, and then later communicated by the executable program to the digital camera after a connection between the server computer system and the digital camera is made. The capability to store and then forward commands and data is not limited to a digital camera application nor is it limited to a particular data storage format. The data storage format can be any format that is understood by both the client computer system and the digital device.

Images and any other data acquired by the digital camera are accessed by the server computer system using the executable program and directly transferred to the client computer system when both the client computer system and the digital camera are on-line at the same time. Alternatively, if the client computer system is not on-line, the data are first stored by the server computer system, and then later communicated to the client computer system after a connection between the server computer system and the client computer system is made.

It should be noted, however, that the present invention can be readily modified to function in other embodiments, such as, for example, hand-held digital devices, lap top personal computers, and the like, which require an efficient process of obtaining the address of a device that is transparent to the user.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The present invention is illustrated by way of example and not by way of limitation, in the figures of the accompanying drawings in which like reference numerals refer to similar elements and in which.

DETAILED DESCRIPTION OF THE INVENTION

Figure 1A:
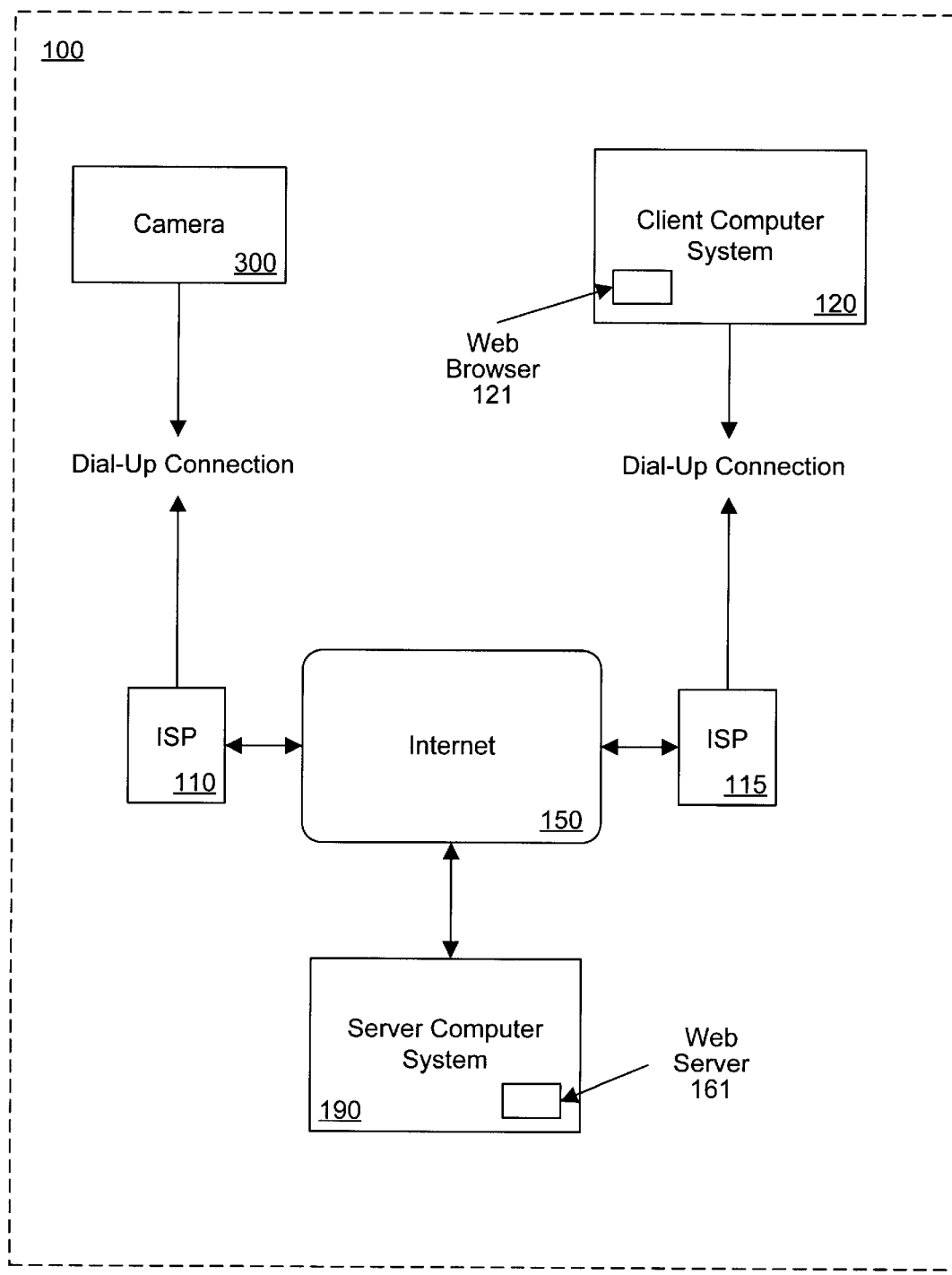
FIG. 1A shows a block diagram of a remote access system via the Internet in accordance with one embodiment of the present invention.

In the following detailed description of the present invention, numerous specific details are set forth in order to enable one of ordinary skill in the art to make and use the invention, and are provided in the context of a patent application and its requirements. Although the present invention will be described in the context of a digital camera, various modifications to the preferred embodiment will be readily apparent to those skilled in the art, and the generic principles herein may be applied to other embodiments. That is, any digital device which displays data, images, icons and/or other items, could incorporate the features described below and that device would be within the spirit and scope of the present invention. Thus, the present invention is not intended to be limited to the embodiment shown but is to be accorded the widest scope consistent with the principles and features described herein.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes (e.g., the processes of FIGS. 7, 8 and 9) of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention provides a method for making a digital device (e.g., a digital camera) and its internally stored data remotely accessible over a communication network such as the Internet or a Local Area Network (LAN). The present invention is an executable program placed on a server computer system (specifically, a Web server) that implements commands initiated by a client (or user) using a client computer system with a Web browser or a program of similar function. The present invention enables the digital camera to be set to continuously take pictures of scenes/ items of interest and allow a client to access those pictures at any time. The present invention allows the client to access the digital camera from virtually an unlimited number of locations and with the camera in virtually any location.

Referring now to FIG. 1A, a block diagram of communication network 100 is shown. Communication network 100 provides a method in accordance with one embodiment of the present invention which implements remote access to camera 300 and its internally stored data. Communication network 100 includes camera 300, Internet Service Provider (ISP) 110, Internet Service Provider 115, client (or user) computer system 120, and server computer system 190. ISP 110 and ISP 115 are both directly coupled to the Internet 150. Client computer system 120 includes Web browser 121 or a program of similar function, and server computer system 190 includes Web server 161. Web browser 121 interprets HTML (HyperText Mark-up Language) documents and other data retrieved by Web server 161.

In the present embodiment of the present invention, an executable program resides on server computer system 190, specifically on Web server 161. The executable program implements and manages the connection between server computer system 190, client computer system 120, and camera 300. The executable program can be implemented as a Java servlet, as a cgi-bin (Common Gateway Interface-binaries), or as a similar type of application.

With reference still to FIG. 1A, client computer system 120 is communicatively coupled to ISP 115 via a POTS (plain old telephone system) dial-up connection. Client computer system 120 is coupled to the Internet 150 via one of a bank of modems maintained on the premises of ISP 115. ISP 115 is coupled directly to the Internet via an all-digital connection (e.g., a T1 line). However, other means of coupling client computer system 120 to the Internet 150 may be used in accordance with the present invention.

As depicted in FIG. 1A, camera 300 is communicatively coupled to server computer system 190 via the Internet 150 using a dial-up connection to ISP 110 via a POTS line. Digital camera 300 accesses ISP 110 using a modem, coupling to one of a bank of modems maintained on the premises of ISP 110. ISP 110 is in turn coupled directly to the Internet 150 via an all-digital connection. However, other means of coupling camera 300 to the Internet 150 may be used in accordance with the present invention.

With reference still to FIG. 1A, it should be further appreciated that while communication network 100 shows camera 300 coupling to Internet 150 via one ISP (e.g., ISP 110) and user 120 coupling to Internet 150 via a separate ISP (e.g., ISP 115), user 120 and camera 300 could be coupled to Internet 150 through a single ISP. In such a case, user 120 and camera 300 would be coupled to two separate access ports (e.g., two separate modems out of a bank of modems) of the same ISP.

Figure 1B:
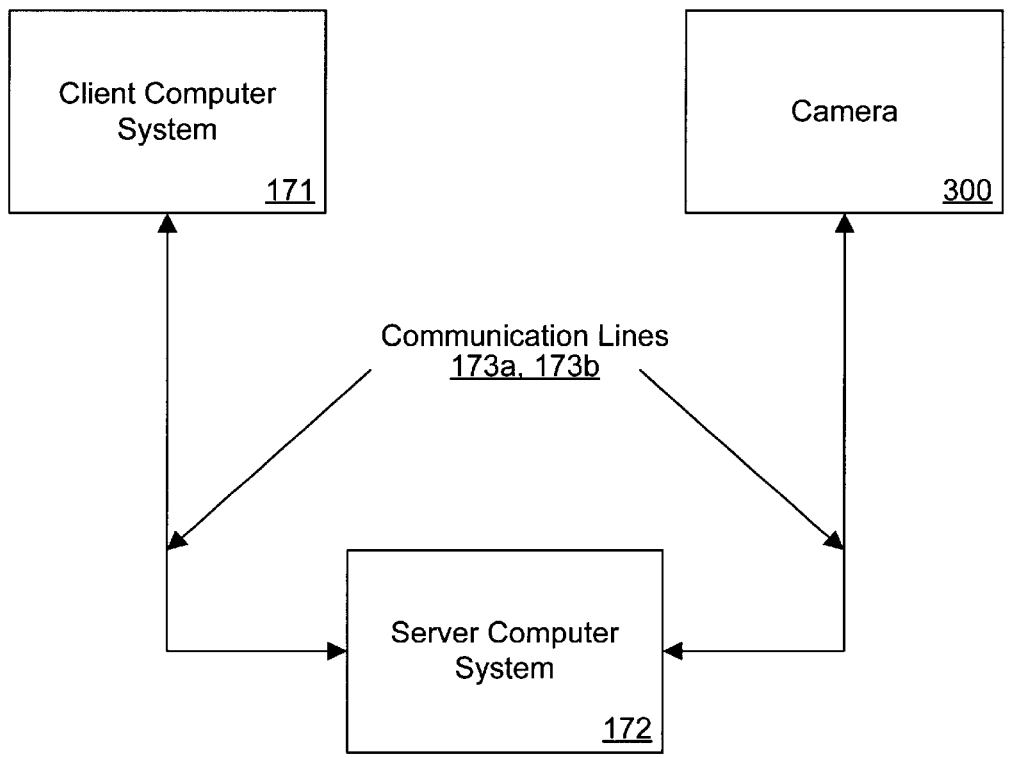
FIG. 1B shows a block diagram of a remote access system via a Local Area Network in accordance with one embodiment of the present invention.

With reference now to FIG. 1B, in another embodiment of the present invention, the communication network is comprised of Local Area Network (LAN) 170. For example, LAN 170 may be a communication network located within a firewall of an organization or corporation. Client (or user) computer system 171 and server computer system 172 are communicatively coupled via communication line 173a. Client computer system 171 includes an application that is analogous to a Web browser for interpreting HTML documents and other data. Similarly, server computer system 172 includes an application analogous to a Web server for retrieving HTML documents and other data. Camera 300 can be coupled to server computer system 172 through any of a variety of means known in the art. For example, camera 300 can be coupled to server computer system 172 via communication line 173b of LAN 170. This coupling can be accomplished over any network protocol that supports a persistent network connection, such as TCP (Transmission Control Protocol), NetBIOS, IPX (Internet Packet Exchange), and LU6.2, and link layers protocols such as Ethernet, token ring, and ATM (Asynchronous Transfer Mode). Alternatively, camera 300 can be coupled to server computer system 172 via an input/output port (e.g., a serial port) of server computer system 172.

Figure 1C:
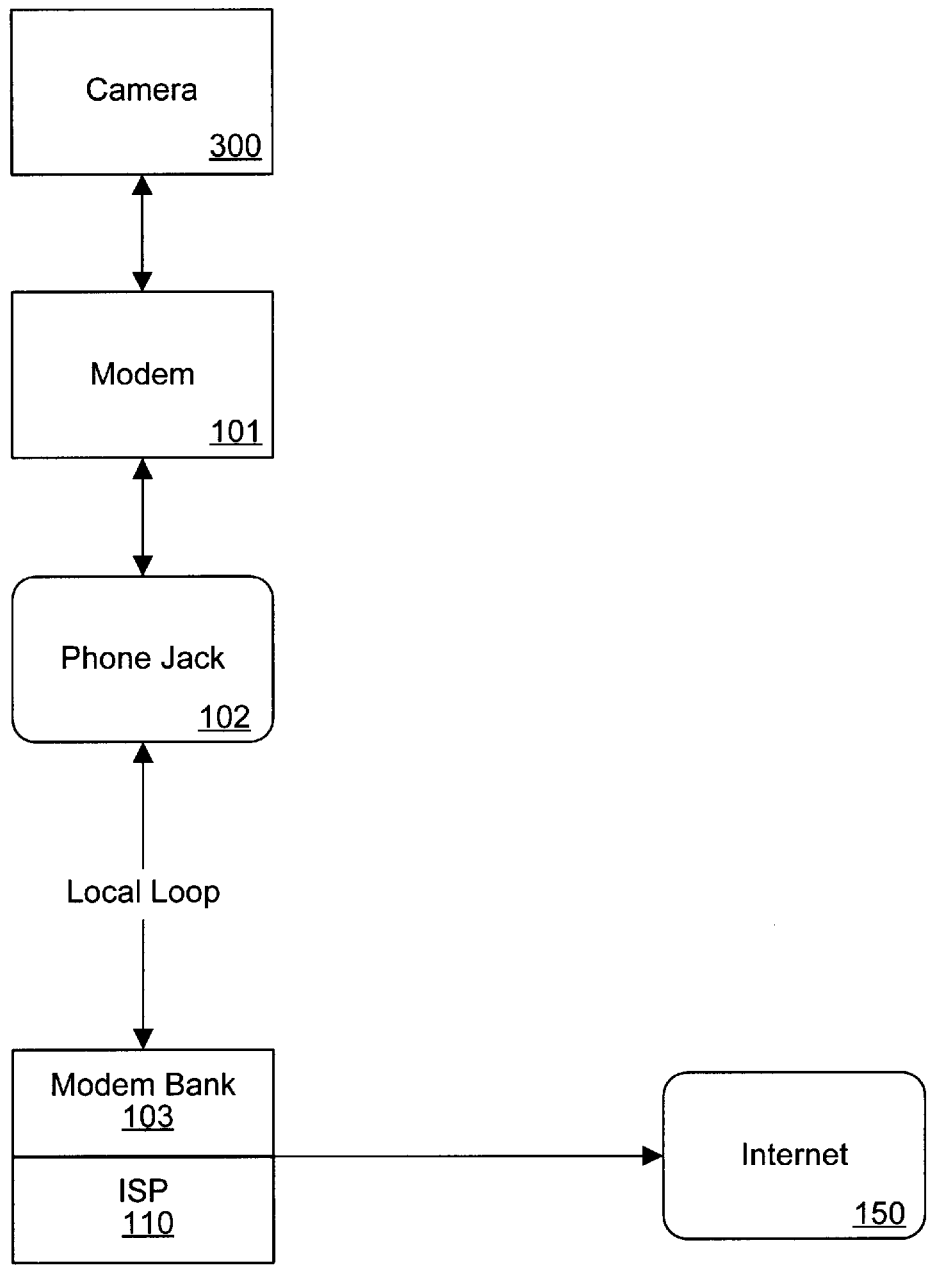
FIG. 1C shows a block diagram of a digital camera coupled to the Internet via an Internet Service Provider.

Referring now to FIG. 1C, a more detailed diagram of camera 300 coupled to the Internet 150 is shown. Camera 300 is coupled to an external modem 101. Camera 300 is coupled to modem 101 via any of several communications means (e.g., Universal Serial Bus, infrared link, and the like). Modem 101 is in turn coupled to a POTS telephone jack 102 at the camera's location. Telephone jack 102 couples modem 101 to one of modems 103 of ISP 110 via the telephone company's local loop. ISP 110 is directly coupled to the Internet 150 via an all digital connection (e.g., a T1 line).

Continuing with reference to FIG. 1C, modem 101 is shown as an external modem. However, the functionality of modem 101 can be implemented directly within the electronics of camera 300 (e.g., via a modem application-specific integrated circuit or ASIC), or alternatively can be implemented as a software-only modem executing on a computer within camera 300. As such, it should be appreciated that, at the hardware connectivity level, modem 101 can take several forms. For example, a wireless modem can be used in which case the camera is not connected via an external wire to any land line. Alternatively, there may be applications in which camera 300 includes suitable electronic components enabling a connection to a conventional computer system network (e.g., Ethernet, AppleTalk, and the like), which is in turn directly connected to the Internet (e.g., via a gateway, a firewall, and the like), thereby doing away with the requirement for an ISP. Hence, it should be appreciated that the present invention is not limited to any particular method of accessing the Internet 150.

Figure 2:
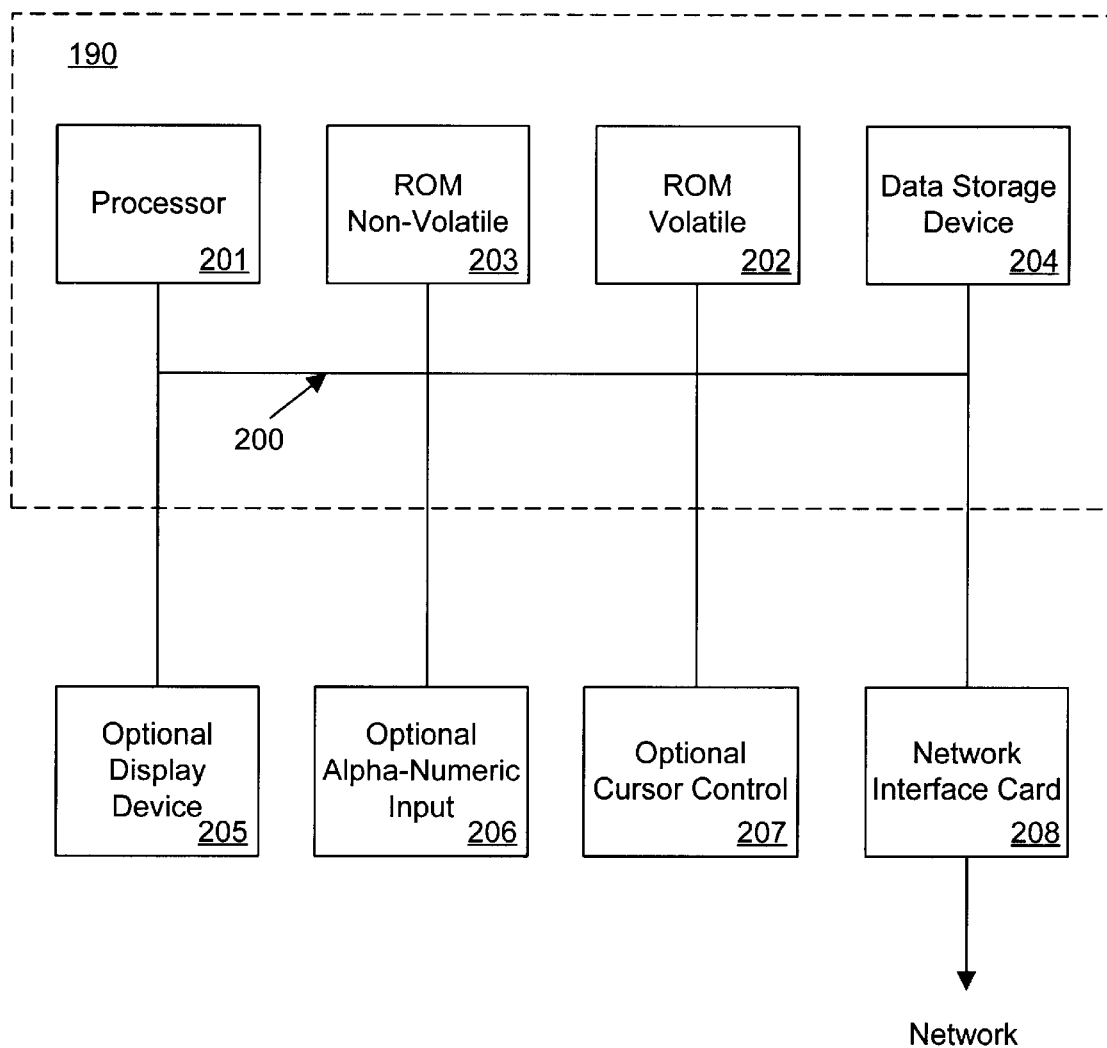
FIG. 2 shows a general purpose computer system upon which embodiments of the present invention may be practiced.

Refer now to FIG. 2 which illustrates server computer system 190 upon which embodiments of the present invention may be practiced (the following discussion is also pertinent to a client computer system). In general, server computer system 190 comprises bus 200 for communicating information, processor 201 coupled with bus 200 for processing information and instructions, random access memory 202 coupled with bus 200 for storing information and instructions for processor 201, read-only memory 203 coupled with bus 200 for storing static information and instructions for processor 201, data storage device 204 such as a magnetic or optical disk and disk drive coupled with bus 200 for storing information and instructions, optional display device 205 coupled to bus 200 for displaying information to the computer user, optional alphanumeric input device 206 including alphanumeric and function keys coupled to bus 200 for communicating information and command selections to processor 201, optional cursor control device 207 coupled to bus 200 for communicating user input information and command selections to processor 201, and network interface card (NIC) 208 coupled to bus 200 for communicating from a communication network to processor 201.

Display device 205 of FIG. 2 utilized with server computer system 190 of the present invention may be a liquid crystal device, cathode ray tube, or other display device suitable for creating graphic images and alphanumeric characters recognizable to the user. Cursor control device 207 allows the computer user to dynamically signal the two-dimensional movement of a visible symbol (pointer) on a display screen of display device 205. Many implementations of the cursor control device are known in the art including a trackball, mouse, joystick or special keys on alphanumeric input device 206 capable of signaling movement of a given direction or manner of displacement. It is to be appreciated that the cursor control 207 also may be directed and/or activated via input from the keyboard using special keys and key sequence commands. Alternatively, the cursor may be directed and/or activated via input from a number of specially adapted cursor directing devices.

Figure 3:
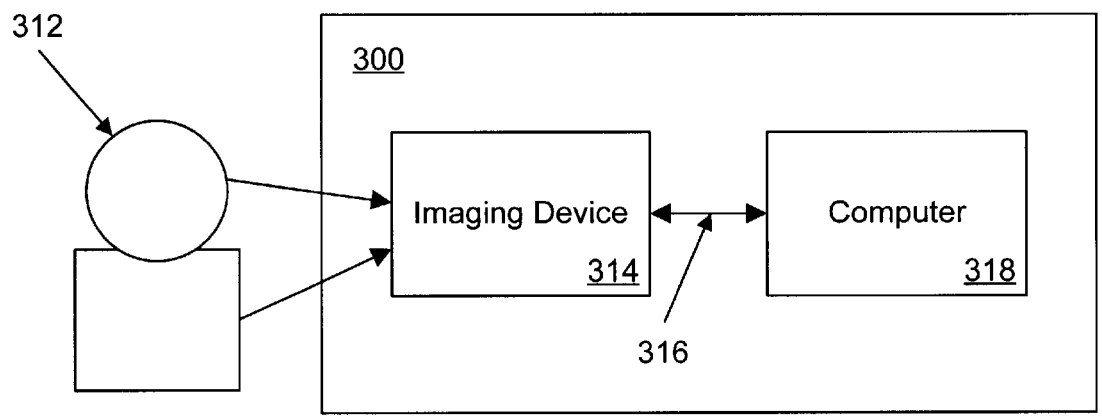
FIG. 3 shows a block diagram of a digital camera for use in accordance with the present invention.

Referring now to FIG. 3, a block diagram of digital camera 300 is shown for use in accordance with the present invention. Camera 300 preferably comprises imaging device 314, system bus 316 and computer 318. Imaging device 314 is optically coupled to object 312 and electrically coupled via system bus 316 to computer 318. Once a photographer has focused imaging device 314 on object 312 and, using a capture button or some other means, instructed camera 300 to capture an image of object 312, computer 318 commands imaging device 314 via system bus 316 to capture raw data representing object 312. The captured raw data are transferred over system bus 316 to computer 318, which performs various processing functions on the data before storing it in memory. System bus 316 also passes various status and control signals between imaging device 314 and computer 318.

Figure 4:
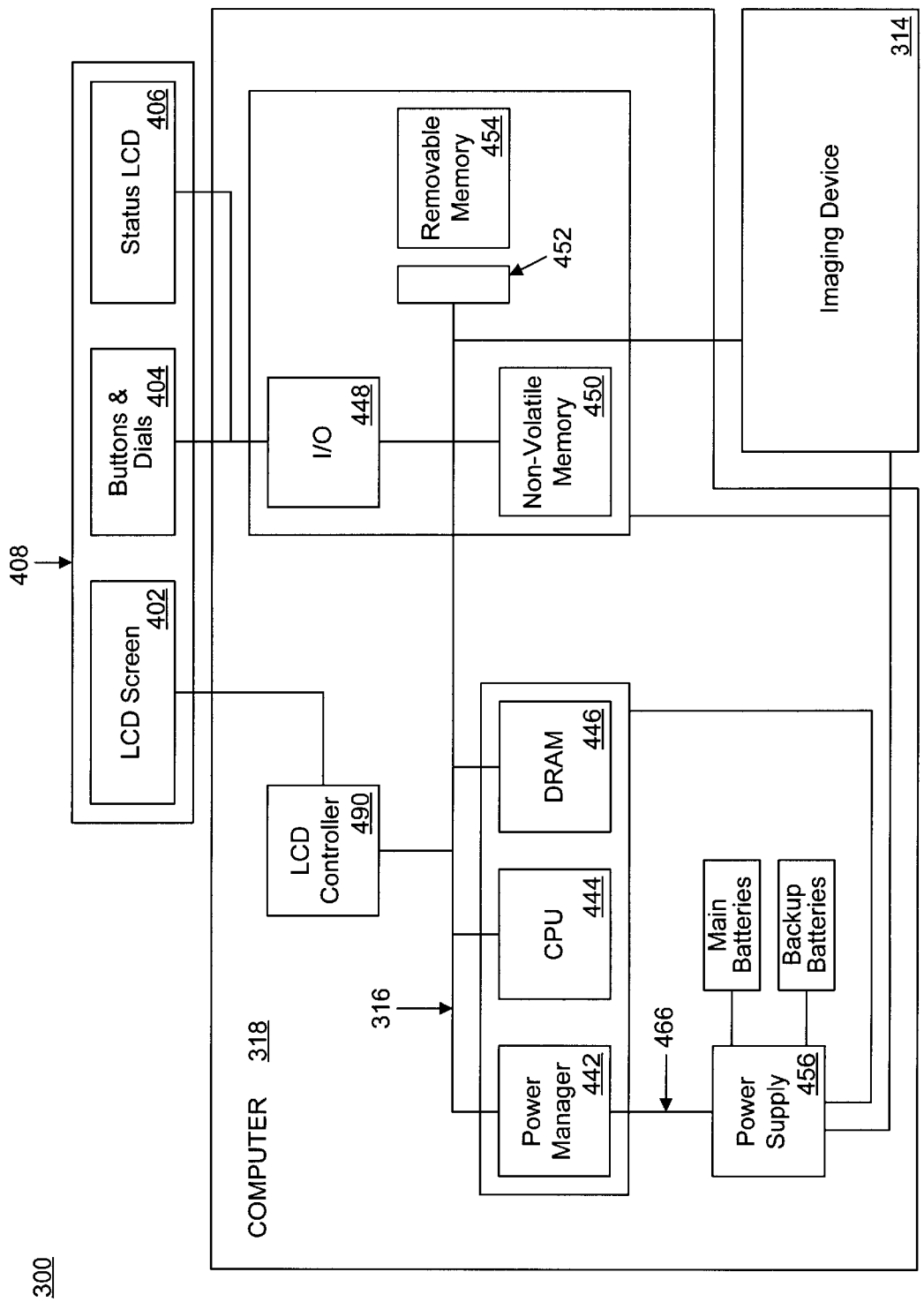
FIG. 4 shows a block diagram of a computer system of a digital camera in accordance with one preferred embodiment of the present invention.

Referring now to FIG. 4, a block diagram of one embodiment of computer 318 is shown. System bus 316 provides connection paths between imaging device 314, an optional power manager 442, central processing unit (CPU) 444, dynamic random-access memory (DRAM) 446, input/output interface (I/O) 448, non-volatile memory 450, and buffers/connector 452. Removable memory 454 connects to system bus 316 via buffers/connector 452. Alternately, camera 300 may be implemented without removable memory 454 or buffers/connector 452.

Power manager 442 communicates via line 466 with power supply 456 and coordinates power management operations for camera 300. CPU 444 typically includes a conventional processor device for controlling the operation of camera 300. In the present embodiment, CPU 444 is capable of concurrently running multiple software routines to control the various processes of camera 300 within a multi-threaded environment. DRAM 446 is a contiguous block of dynamic memory which may be selectively allocated to various storage functions. LCD controller 490 accesses DRAM 446 and transfers processed image data to LCD screen 402 for display.

I/O 448 is an interface device allowing communications to and from computer 318. I/O 448 permits an external device (not shown) to connect to and communicate with computer 318. I/O 448 also interfaces with a plurality of buttons and/or dials 404, and optional status LCD 406, which in addition to LCD screen 402, are the hardware elements of the camera's user interface 408.

Non-volatile memory 450, which may typically comprise a conventional read-only memory or flash memory, stores a set of computer-readable program instructions to control the operation of camera 300.

Figure 5:
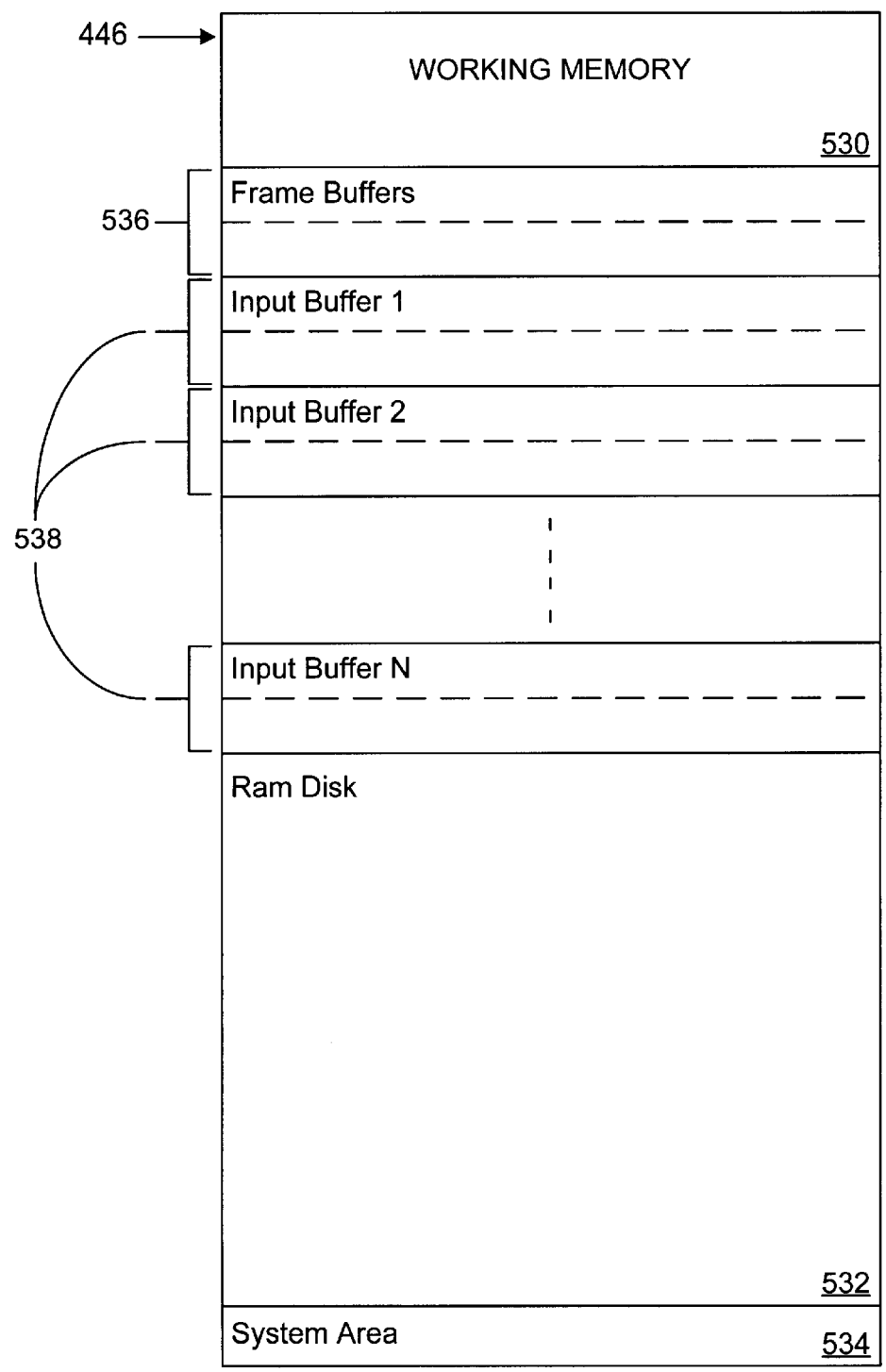
FIG. 5 shows a memory map of a dynamic random access memory of a digital camera in accordance with one embodiment of the present invention.

Referring now to FIG. 5, a memory map showing one embodiment of dynamic random access memory (DRAM) 446 is shown. In the present embodiment, DRAM 446 includes RAM disk 532, system area 534, and working memory 530.

RAM disk 532 is a memory area used for storing raw and compressed data and typically is organized in a "sectored" format similar to that of conventional hard disk drives. In the present embodiment, RAM disk 532 uses a well-known and standardized file system to permit external devices, via I/O 448 of FIG. 4, to readily recognize and access the data stored on RAM disk 532. System area 534 typically stores data regarding system errors (for example, why a system shutdown occurred) for use by CPU 444 (FIG. 4) upon a restart of computer 318 (FIG. 3).

Working memory 530 includes various stacks, data structures and variables used by CPU 444 while executing the software routines used within computer 318. Working memory 530 also includes several input buffers 538 for temporarily storing sets of raw data received from imaging device 314 (FIG. 3), and frame buffer 536 for storing data for display on LCD screen 402 (FIG. 4). In the present embodiment, each input buffer 538 and frame buffer 536 are split into two separate buffers (shown by the dashed lines) to improve the display speed of the digital camera and to prevent the tearing of the image in LCD screen 402.

Figure 6:
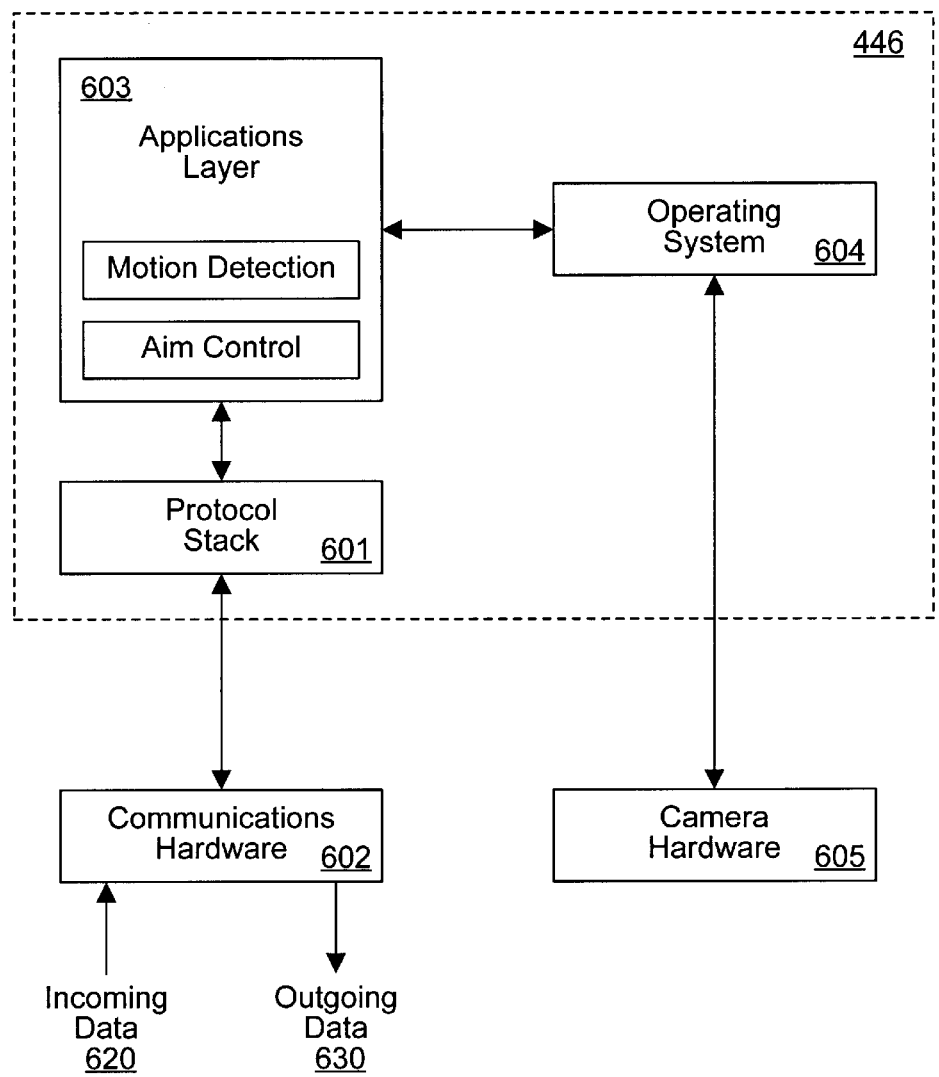
FIG. 6 shows a diagram of the connectivity and application software of a digital camera in accordance with one embodiment of the present invention.

Referring now to FIG. 6, a diagram of the connectivity and application software of camera 300 of FIG. 3 is shown. At the software level, computer 318 (FIG. 3) of camera 300 hosts any network protocol that supports a persistent network connection. This coupling can be accomplished over any network protocol that supports a persistent network connection, such as TCP/IP (Transmission Control Protocol/Internet Protocol) including Point-to-Point Protocol, NetBIOS, IPX, and LU6.2, and link layers protocols such as Ethernet, token ring, and ATM. Protocol stack 601 interfaces with the communications hardware 602 (e.g., a modem) of camera 300 and the application layer 603. The bottom of protocol stack 601 includes communication hardware interface drivers which interface directly with the various communications hardware with which camera 300 must function (e.g., a Universal Serial Bus and the like). Applications layer 603, protocol stack 601, and operating system 604 are installed as software modules in DRAM 446 (FIG. 4) of camera 300. Software applications within applications layer 603 interface with operating system 604. Operating system 604 controls the hardware functionality of camera 300 (e.g., taking pictures, storing pictures, and the like) via camera hardware 605. Incoming data 620, such as HTTP (HyperText Transfer Protocol) requests and the like, are received and outgoing data 630, such as HTML (HyperText Mark-up Language) files and the like, are transferred to and from camera 300 via protocol stack 601 and communications hardware 602. Web browser 121 of FIG. 1A (or a program of similar function) can process data files, launch plug-ins, and run Java applets that communicate with camera 300 in a variety of methods in addition to those methods involving an exchange of HTML files.

Figure 7:
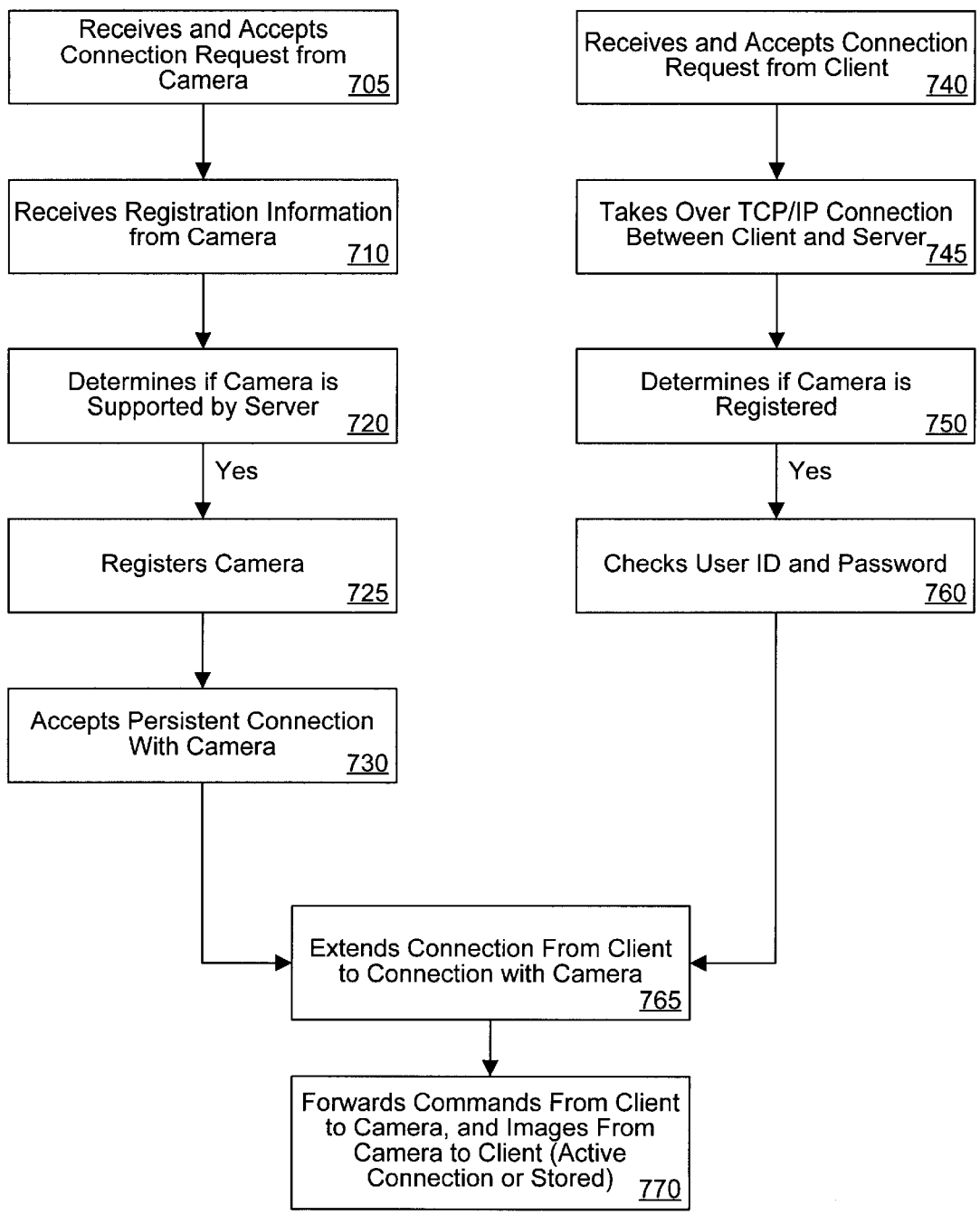
FIG. 7 is a flowchart of a process for remotely accessing a digital camera implemented by an executable program in accordance with one embodiment of the present invention.

FIG. 7 illustrates an executable program 700 for client computer system 120 (specifically, Web browser 121 of FIG. 1A or a program of similar function) to remotely access camera 300 (FIG. 3), where executable program 700 is implemented in accordance with the present invention as program instructions stored in computer-readable memory units (e.g., read-only memory 203) and implemented by processor 201 of server computer system 190 of FIG. 1A (specifically, by Web server 161). Executable program 700 performs functions both for and in response to Web browser 121 (or a program of similar function) and camera 300. The description below first discusses the steps associated with setting up a connection between executable program 700 and camera 300, then discusses the steps associated with setting up a connection between executable program 700 and Web browser 121 (or a program of similar function); however, the present invention is not limited by the order in which these steps are presented.

In the present embodiment, executable program 700 is identified and accessed by its own unique address, commonly referred to as an URL (Unified Resource Locator), as is well known in the art. The URL for executable program 700 fully describes where it resides on a communication network (e.g., the Internet 150) and how it is accessed. In the present embodiment, included in the URL for executable program 700 is the name of camera 300. Accordingly, in one embodiment using a servlet for executable program 700, a standard format for a URL is: http://webserverHostName/cameraServletWellKnownName/cameraName.

In step 705, executable program 700 receives and accepts a connection request from camera 300. Executable program 700 runs constantly on Web server 161 and is configured to listen for connection requests on a plurality of communication protocols (e.g., TCP, NetBIOS, and the like). In the present embodiment, camera 300 is connected to executable program 700 via Web server 161 as described in conjunction with FIG. 1A, and opens the connection using the connectivity and application software described in conjunction with FIG. 6.

In step 710, executable program 700 receives and reads registration information from camera 300. As mentioned above, executable program 700 is configured to communicate using a number of different communication protocols. Such registration information includes the name of the camera and authentication information such as security information and account information. Executable program 700 uses the camera name to identify the camera and locate it in response to a client request.

In step 720, executable program 700 compares the registration information with a predefined access control list to determine if camera 300 is a camera for which Web server 161 is to provide support and service. If not, executable program 700 closes the connection between Web server 161 and camera 300.

In step 725, upon successful completion of step 720, executable program 700 registers camera 300 and stores the camera's name and associated requirements, such as security and account information. Executable program 700 also sends a message that camera 300 is registered. At this point, the connection between executable program 700 can be either terminated or maintained at the option of the camera's operator. If the connection is terminated, the registration information is maintained by Web server 161 and can be later accessed by executable program 700 when a subsequent connection is made with camera 300.

In step 730, executable program 700 accepts the connection request from camera 300 and thus has a persistent and long term connection with camera 300. As described above, the connection can be an ongoing connection maintained from the time when camera 300 was first registered. New connections can be made in the future whenever camera 300 reinitiates the registration protocol. Once camera 300 and executable program 700 have established a connection, they then wait until a client also makes a connection to access the camera. However, as will be described below in conjunction with step 770, it is not necessary for there to be an open connection between the Web server and the camera at the same time that there is an open connection between the Web browser (or a program of similar function) and Web server to accomplish remote access of the camera in accordance with the present invention.

In step 740, executable program 700 receives and accepts a request for a connection from a client. The client enters the URL of executable program 700, including the name of the camera (e.g., camera 300) to which access is desired, into a Web browser (e.g., Web browser 121 on client computer system 120 of FIG. 1A or a program of similar function). Using standard communication protocols such as TCP/IP, Web server 161 is queried with the URL for executable program 700. Web server 161 recognizes the URL and makes the connection to executable program 700. Thus, the present invention establishes a single location identified by a known URL where the client always goes to connect to the camera, no matter where the camera is or where the client is. (For those cases in which TCP/IP is not available—for example, when the device is not attached to the Internet or the like—camera 300 connects to executable program 700 directly using a well-known address that is associated with the protocol being used, such as a NetBIOS name.)

In step 745, executable program 700 then assumes control over the TCP/IP connection between Web browser 121 (or a program of similar function) and Web server 161. Executable program 700 establishes a persistent and long term connection between the browser and server. That is, the connection between Web browser 121 (or a program of similar function) and Web server 161 is kept open by executable program 700. As will be described below in conjunction with step 770, it is not necessary for there to be an open connection between the client computer system and the Web server at the same time that there is an open connection between the Web server and the camera to accomplish remote access of the camera in accordance with the present invention.

In step 750, executable program 700 next determines if camera 300 is registered as discussed in conjunction with step 735. If camera 300 is not registered, executable program 700 sends an appropriate message to the client to indicate such.

In step 760, if the camera is registered, executable program 700 validates the required access information provided by the client against the security and account information provided when camera 300 was registered. For example, executable program 700 validates whether the client is utilizing an authorized password or user name. If not, executable program 700 transmits an appropriate message to the client. The present invention can optionally provide additional services related to security or account information. For example, it could control the type of access a client is permitted based on the authentication information received from the client, or it could verify credit information and bill the client for services requiring payment.

In step 765, upon satisfactory completion of step 760, executable program 700 extends the connection from Web browser 121 (or a program of similar function) to camera 300 if there is an established connection to the camera as described in conjunction with step 730. Hence, a client using Web browser 121 or a program of similar function has direct, remote access to camera 300 via executable program 700 in Web server 161.

In step 770, executable program 700 forwards commands from a client to camera 300, and forwards images and any other data from camera 300 to the client, via Web server 161 and Web browser 121 (or a program of similar function). That is, executable program enables a direct communication between the client computer system and the camera allowing the client to remotely access and manage the camera. If the client and the camera are both concurrently connected to executable program 700, then the client immediately receives the data, and camera 300 immediately executes any commands from the client.

However, if Web browser 121 (or a program of similar function) and camera 300 are not each connected at the same time, remote access to the camera is still accomplished in accordance with the present invention. If camera 300 is not on-line, a client uses Web browser 121 (or a program of similar function) to access Web server 161 and executable program 700. The client transmits commands, and executable program 700 stores the commands on Web server 161. The client may then close the connection to the Web server. Subsequently, when camera 300 opens a connection to Web server 161 and executable program 700, executable program 700 retrieves the commands and forwards them to the camera. Camera 300 downloads the commands and executes them. The results from executing the commands are then sent to executable program 700, which stores them on Web server 161 until they are retrieved by the client.

Similarly, if camera 300 establishes a connection with Web server 161 and executable program 700 but the client is not on-line, the camera can, for example, download images and any other data that executable program 700 stores on Web server 161. Camera 300 may then close the connection to the Web server. The client then later makes a connection to Web server 161 and executable program 700, which retrieves the data and forwards it to the client. The client can also enter commands at this time, which are stored by executable program 700 as described above.

In summary, with references to FIG. 1A and FIG. 7, the client, via Web browser 121 or a program of similar function, Web server 161 and executable program 700, accesses camera 300 to request and retrieve data. Web browser 121 or a program of similar function inserts the Internet address inside the data request (e.g., a HTTP request) and sends the request to Web server 161. Web server 161 receives the data request and associates the request with executable program 700, which in turn assumes the connection between Web server 161 and Web browser 121 (or a program of similar function), and which also establishes a connection between Web browser 121 (or a program of similar function) and camera 300. Executable program 700 subsequently forwards commands from the client to camera 300, and retrieves the requested data (e.g., a HTML file) containing the data and sends it back to Web browser 121 (or a program of similar function). Web browser 121 (or a program of similar function) then interprets the commands and displays the resulting image. The process of accessing a data file from a Web server is commonly referred to as accessing a Web page. Similarly, the process of sending data files from a Web server to a Web browser is commonly referred to as sending a Web page.

Thus, as described above, the present invention provides an intuitive and easy-to-use interface enabling remote access between a client and a camera. By functioning with widely used and familiar Web browsers (or programs of similar function) using standard format URLs to identify the executable program and camera, the present invention provides a simple and familiar interface for accessing the camera. By registering the camera and using an unchanging URL name to identify the executable program and the camera, the present invention enables the client to locate and access the camera from any remote location no matter where the camera is located. In addition, by using a Java servlet or a cgi-bin for the executable program, the present invention is supported by commonly used Web servers and is readily implemented.

Executable program 700 is located on the Web server and not on camera 300, so it does not require additional and substantial memory dedicated to enabling remote access. As such, the present invention permits remote access within the constraints of the size of the camera. In addition, in accordance with the present invention, camera 300 does not require a separate, external computer system (e.g., a personal computer system) for connecting to ISP 110 (FIG. 1A) or for implementing commands and transmitting data, thus providing an inexpensive method for providing remote access to cameras.

Also, by locating the present invention on a Web server (e.g., Web server 161 of FIG. 1A), the Web server becomes a focal point for accessing and managing a plurality of cameras that otherwise would have to be managed and configured separately. For example, executable program 700 on Web server 161 could be updated with new software, and in effect all cameras accessed through that executable program would automatically be updated as well. As another example, executable program 700 could be configured to compile data regarding interactions between clients and all cameras accessed by the executable program. In another example, in accordance with the present invention, a client needs to go only to a single location to determine which of a plurality of cameras served by the executable program have data that have been downloaded to the Web server. Thus, instead of having to access a number of cameras separately, the present invention establishes a single location from which a client can access information about several cameras.

By functioning with a Web-based interface and widely used Web browsers (or programs of similar function), the present invention provides a simple, intuitive, and familiar interface for accessing camera 300's functionality. Accordingly, camera 300's controls and functions are intuitively easy to utilize. Since Web pages and their associated controls (e.g., push buttons, data entry fields, and the like) are very familiar to most users, the remote access functionality of camera 300 can be utilized without requiring a extensive learning period for new users. For example, a consumer purchasing a remotely accessible camera is typically able to easily and immediately use the remote accessibility functions with minimal set-up.

Figure 8:
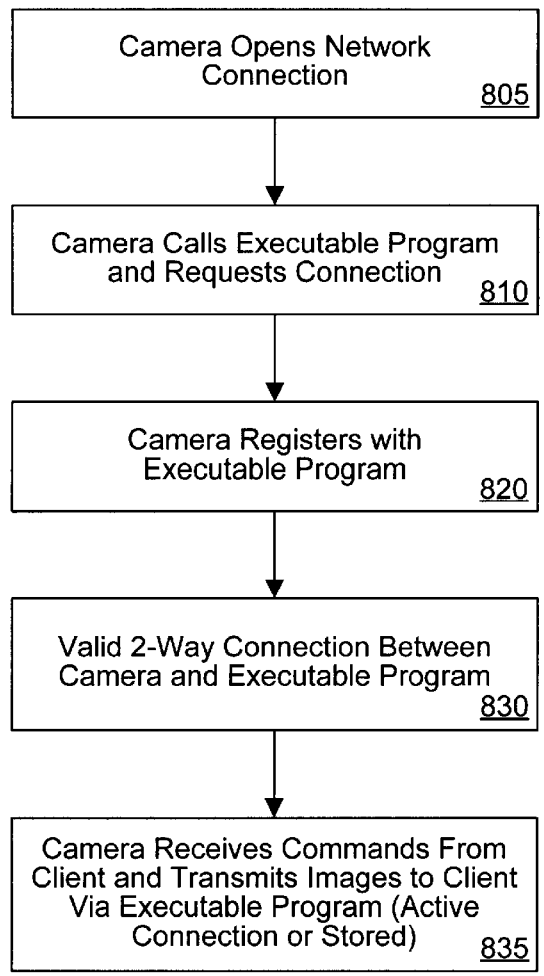
FIG. 8 is a flowchart of a process employed by a digital camera for remote access in accordance with one embodiment of the present invention.

FIG. 8 illustrates a process 800 for remotely accessing camera 300 (FIG. 3), where process 800 is implemented as program instructions stored in computer-readable memory units (e.g., non-volatile memory 450 of FIG. 4) and implemented by CPU 444 (FIG. 4) of camera 300 in accordance with the present invention. FIG. 8 illustrates the process for remotely accessing a camera from the perspective of the actions performed by the camera and the camera operator in accordance with the present invention.

In step 805, camera 300 of FIG. 3 opens a connection to communication network 100 of FIG. 1A. In the present embodiment, camera 300 is coupled to server computer system 190 (specifically, Web server 161) as described in conjunction with FIG. 1A, and opens the connection using the connectivity and application software described in conjunction with FIG. 6. As described in conjunction with FIG. 1C, in the present embodiment, camera 300 couples directly to the telephone system such that a separate and dedicated computer system (e.g., a personal computer system) is not necessary.

In step 810, with the connection made to Web server 161, camera 300 requests a connection to executable program 700 (FIG. 7). For cases in which camera 300 is accessing executable program 700 via, for example, a TCP/IP network such as the Internet 150, then executable program 700 is identified with a URL that is used by the camera to access the executable program. For those cases in which TCP/IP is not available (e.g., when the device is not attached to the Internet or the like), camera 300 connects to executable program 700 directly using a well-known address that is associated with the protocol being used, such as a NetBIOS name.

In step 820, with the camera connected to the executable program, camera 300 registers with executable program 700. For example, camera 300 provides information including an identification name and authentication information such as a password and account information. The information is electronically transmitted from camera 300 and read by executable program 700. Based on this information, the connection between camera 300 and executable program 700 is established if the camera is of the type that is designated to be supported by Web server 161.

In step 830, camera 300 and executable program 700 are linked via a persistent and long term connection; that is, the connection remains open awaiting a client to request access to the camera via Web server 161. As discussed above in conjunction with FIG. 7, it is not necessary for the camera and a client to be connected at the same time to executable program 700.

In step 835, camera 300 receives commands from and transmits data to a client using a Web browser or a program of similar function on a client computer system (e.g., client computer system 120 and Web browser 121 of FIG. 1A or a program of similar function). As described above in conjunction with FIG. 7, the commands and data can be transmitted through an active connection or stored on the Web server.

In the present embodiment, camera 300 is provided with several different operating modes for supporting various camera functions. In capture mode, camera 300 supports the actions of preparing to capture an image and of capturing an image. In review mode, camera 300 supports the actions of reviewing camera contents, editing and sorting images, and printing and transferring images. In play mode, camera 300 allows the client to view screen-sized images in the orientation that the image was captured. Play mode also allows the client to hear recorded sound associated to a displayed image, and to play back sequential groupings of images, which may comprise time lapse, slide show, and burst image images. The client preferably switches between the capture, review, and play modes.

Camera 300 is capable of implementing a wide variety of remote access and remote imaging/surveillance applications. In the present embodiment, camera 300 only records successive images for remote access by the client. The images are loaded into the camera's memory on a first-in, first-out (FIFO) basis, with the earliest recorded image being replaced by the latest recorded image. The number of images available to the client depends upon the amount of installed memory in the camera.

With reference still to step 835 of FIG. 8, when the client and the camera are connected to the Web server at the same time, the commands can be transmitted directly from Web browser 121 (or a program of similar function) to camera 300 via executable program 700 on Web server 161, and camera 300 then executes the commands on-line. Alternatively, when camera 300 is not connected to executable program 700, a client can store commands on Web server 161 by accessing the Web server in a normal fashion, then entering the commands to be stored via executable program 700. Camera 300 then executes the commands when it subsequently connects with executable program 700.

Also in step 835, camera 300 transmits data to a client. Similar to the above, data from camera 300 can be transmitted directly to Web browser 121 or a program of similar function via executable program 700 on Web server 161, when the client and the camera are connected to the Web server at the same time. Alternatively, when a client is not connected to executable program 700, the data are stored on Web server 161 by executable program 700, which then retrieves and transmits the data to a client when the client subsequently connects with executable program 700.

This process of accessing camera 300 from Web browser 121 or a program of similar function occurs transparently with respect to the client. In a typical case, for example, the client types the URL for executable program 700 (which includes the name of camera 300) into Web browser 121 (or a program of similar function) and hits "enter" or "return". In accordance with the present invention, the next Web page the client views is the image generated by the data returned from camera 300. Beyond entering the URL for executable program 700 including camera 300, no further action from the client is required in order to access the Web pages hosted by camera 300.

Figure 9:
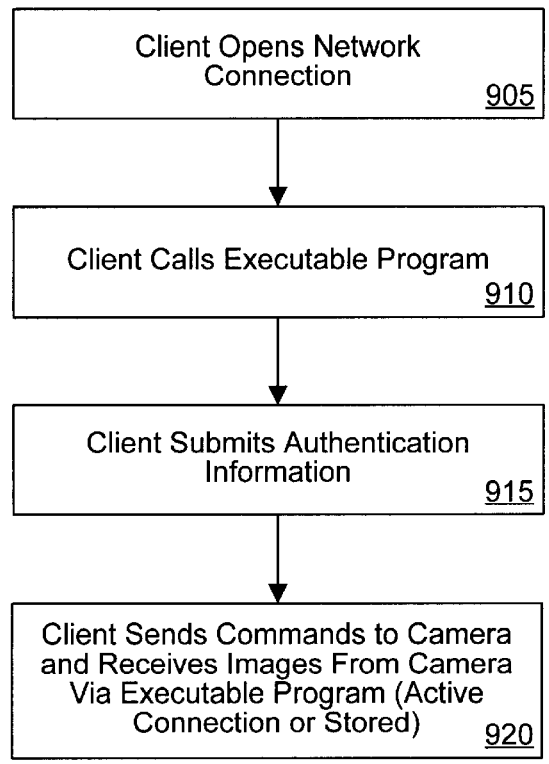
FIG. 9 is a flowchart of a process employed by a client computer system for remote access of a digital camera in accordance with one embodiment of the present invention.

FIG. 9 illustrates a process 900 for remotely accessing camera 300 (FIG. 3), where process 900 is implemented as program instructions stored in computer-readable memory units (e.g., read-only memory) and implemented by the central processor of client computer system 120 (specifically, Web browser 121 or a program of similar function) of FIG. 1A. FIG. 9 illustrates the process for remotely accessing a camera from the perspective of the actions performed by the client in accordance with the present invention.

In step 905, the client opens a network connection such as a dial-up connection to ISP 115 of FIG. 1A.

In step 910, the client enters into a Web browser (e.g., Web browser 121 on client computer system 120 of FIG. 1A or a program of similar function) the URL of executable program 700, including the name of the camera (e.g., camera 300) to which access is desired. Alternatively, the client enters the URL of executable program 700 only. (For those cases in which TCP/IP is not available—for example, when the device is not attached to the Internet or the like—camera 300 connects to executable program 700 directly using a well-known address that is associated with the protocol being used, such as a NetBIOS name.) Using standard communication protocols such as TCP/IP, Web server 161 is queried with the URL for executable program 700. Web server 161 recognizes the URL and makes the connection to executable program 700. A persistent and long term two-way connection is opened between the client on Web browser 121(or a program of similar function) and executable program 700.

In step 915, the client enters the authentication information required to gain access to executable program 700 and camera 300.

In step 920, as explained above, from his/her remote location the client sends commands to camera 300 and receives images from the camera. As explained above, the client and the camera do not have to be connected to the Web server at the same time to enable remote access. Depending on the particular application, the Web page for camera 300 can include control buttons, data entry fields, drop-down menus, and the like.

Thus, executable program 700 enables the client to access from a remote location the functional controls of camera 300 as well as the images and other data acquired by the camera.

Pseudo-Code Sections A, B, C, D and E below provide additional details regarding processes 700, 800 and 900 of FIGS. 7, 8 and 9. Pseudo-Codes Sections A through E represent the method of one embodiment of the present invention. However, it is appreciated that other embodiments are possible in accordance with the present invention.

With references to FIGS. 7 and 9, the pseudo-code for the connection of a client to the server computer system, specifically to executable program 700, is described in accordance with one embodiment of the present invention in Pseudo-Code Section A below.

Pseudo-Code Section A: Client Connection Setup

---

1. Client sends HTTP Post command to http://serverName/gateway device="deviceName"
   Note: authentication/security data is optional and is handled by the browser.
2. Client receives HTTP response from Gateway
3. If response is OK or OKDataPresent
{
   Client has TCP connection it can use to send/receive anything to/from the device.
   The protocol used can be any that the Client & Device agree upon.
}
else
{
   The response is Failed or DataPresent.
   The TCP connection is closed:
}

---

Note: the OKDataPresent and DataPresent responses are informational. The Client at any time on separate connections may issue a CacheData or GetCache command to the Gateway. See algorithms C.

With references to FIGS. 7 and 8, the pseudo-code for the connection of a device (e.g., digital camera 300 of FIG. 1A) to the server computer system, specifically to executable program 700, is described in accordance with one embodiment of the present invention in Pseudo-Code Section B below.

Pseudo-Code Section B: Device Connection Setup/ Registration

---

1. Device establishes a connection to the Gateway using any networking protocol
   supported by the Gateway(TCP, NetBIOS, IPX, 802.2, etc) using a known address.
2. Device sends a Register request to the Gateway on the connection passing
   its name (and optionally authentication/security information).
3. Device receives response from Gateway
4. If the response is OK or OKDataPresent
{
   The Device may use the existing connection to wait for requests from clients.
   or the Device may optionally close the connection.
}
else
{
   The response is Failed or DataPresent
   The connection is closed.
}

---

Note: the OKDataPresent and DataPresent responses are informational. The Device at any time on separate connections may issue a CacheData or GetCache command to the Gateway. See algorithm D.

With reference to FIG. 7, the pseudo-code for executable program 700 in response to a client connection request is described in accordance with one embodiment of the present invention in Pseudo-Code Section C below.

Pseudo-Code Section C: Gateway Handles Client Connection Request

```
Start:
    Wait for incoming requests from clients
    if its at an HTTP Post command with parameters CacheData and deviceName
    {
        go to CacheData
    }
    else if its an HTTP Get command with parameters GetCache and deviceName
    {
        go to GetCache
    }
    if its an HTTP Post command from a client with the name of device
    {
        go to Connect
    }
    else
    {
        go to Fail
    }
Connect:
    Look up device by name in registry
    if the device entry is found
    {
        if there is a device connection id in the entry
        {
            if the entry is not busy
                go to Success
            else go to Fail
        }
        else
        {
            Attempt to establish connection with device at last known address
            if connection established
            {
                go to Success
            }
            else to to Fail
        }
    }
    else
    {
        send Fail response
        close connection
        go to Start
    }
Fail:
    if there is data in the cache
    {
        set response to DataPresent
    }
    else
    {
        set response to Fail
    }
    send response
    close connection
    go to Start
Success:
    if there is data m the cache
    {
        set response to OkDataPresent
    }
    else
    {
        set response to Ok
    }
    store connection id of the client in the registry entry
    go to Start
CacheData:
    Look up device name in registry
    if not found
    {
        set response to Fail
        send response
        close connection
        go to Start
    }
    else
    {
        store data in Cathe for device with identification information
```

```
        send Ok response
        close connection
        go to Start:
    }
GetCache:
    Look up device name in registry
    if not found
    {
        set response to Fail
        send response
        close connection
        go to Start
    }
    else
    {
        send data in Cache for this client
        close connection
        go to Start
}
```

With reference to FIG. 7, the pseudo-code for executable program 700 in response to a device connection request is described in accordance with one embodiment of the present invention in Pseudo-Code Section D below.

Pseudo-Code Section D: Gateway Handles Device Requests

```
Start:
    Wait for incoming requests from devices
    Receive incoming request
    if its a Register request
    {
        go to Register
    }
    else if its a CacheData request
    {
        go to CacheData
    }
    else if its a GetCache request
    {
        go to GetCache
    }
    else
    {
        return Failed
        close connection
        go to Start
    }
Register:
    Note: The gateway may optionally authenticate device
    Get device name from Register request
    look up name in table
    if name is found
    {
        go to Success
    }
    else
    {
        The gateway may optionally add the name or reject the
        registration attempt, then go to Success or Fail
        respectively.
    }
Success:
    check for the presence of cached client data
    if cached data is present
    {
        set response to OkDataPresent
    {
    else
    {
        set response to Ok
    }
    Store a connection id for the incoming connection in
    the registry entry for the device.
    send response
    go to Start
Fail:
    if cached data from clients is present for this device
    {
        set response to DataPresent
    }
    else
    {
        set response to Fail
    }
    send response
    close connection
    go to Start
CacheData:
    Look up device name in registry
    if not found
    {
        set response to Fail
        send response
        close connection
        go to Start
    }
    else
    {
        store data in Cache for client
        send Ok response
        close connection
        go to Start:
    }
GetCache:
    Look up device name in registry
    if not found
    {
        set response to Fail
        send response
        close connection
        go to Start
    }
    else
    {
        send data in Cache for device to the device
        close connection
        go to Start
}
```

With reference to FIG. 7, the pseudo-code for executable program 700, specifically the handling of data when an open connection is present between the device and the client computer system, is described in accordance with one embodiment of the present invention in Pseudo-Code Section E below.

Pseudo-Code Section E: Gateway Handles Data on Existing Connections

```
Start:
    Wait for data
    Map the incoming connection id to its partner connection id
    if there is incoming data
    {
        Send the data out on the partner connection id
        go to Start
    }
    else if the connection closed
    {
        if its a client connection
    {
        Remove the client's connection id from the
        device's entry in the registry.
    }
    else
    {
        Remove both the client and device connection ids
        from the device's entry in the registry.
        Close the client's connection.
        go to Start
    }
}
go to Start
```

As described above, the remote accessibility of camera 300 provides for many new applications of digital imagery. One such application involves setting up camera 300 at some remote location and using it to take pictures at successive intervals. These pictures would be accessed via the Internet 150 as they are taken. The interval can be adjusted (e.g., more or less pictures per minute) in response to commands entered by a client via a Web browser (e.g., Web browser 121 of FIG. 1A or a program of similar function).

Another application involves using camera 300 in conjunction with a motion detector. When used in conjunction with a motion detector, camera 300 can be configured to capture an image in response to receiving a signal from the motion detector (e.g., detecting the motion of an intruder), thereby taking a picture of whatever triggered the detector's signal output. Alternatively, camera 300 can detect motion by simply comparing successive images to detect changes between them, thereby dispensing with the need for a separate motion detector.

Yet another application involves using camera 300 in conjunction with a remote aiming device. Camera 300 can be mounted on a remotely operated aiming device (e.g., a motorized tripod). The aiming device is controlled via the Internet 150 in the same manner the camera is controlled via the Internet 150. Alternatively, camera 300 could be coupled to control the remote aiming device directly. The remote aiming device allows a client to control the field of view of the camera 300 in the same manner the client controls other functionality (e.g., picture resolution, picture interval, and the like).

In this manner, executable program 700 of the present invention is able to implement sophisticated remote surveillance of the type previously performed by expensive, prior art closed circuit television devices. Unlike the prior art, however, executable program 700 is inexpensive and relatively simple to implement.

Thus, the present invention provides a method for making a digital camera and its internally stored data remotely accessible. The present invention enables the digital camera to be set to continuously take pictures of scenes and items of interest and to allow a user to access those pictures at any time. The present invention implements remote accessibility via a communication network such as the Internet, thus allowing the user to access the digital camera from virtually an unlimited number of locations and with the camera in virtually any location.

A digital camera in accordance with the present invention does not require a separate, external computer system (e.g., a personal computer system) for Internet connectivity, thus providing an inexpensive method for making remotely accessible digital cameras widely available. In addition, a digital camera in accordance with the present invention is accessed via the widely used and very familiar Web browser (or a program of similar function). By functioning with typical, widely used Web browsers (or programs of similar function), the present invention provides a simple, intuitive, and familiar interface for remotely accessing the digital camera's functionality and capabilities. In so doing, the controls and functions of the digital camera are intuitively easy to utilize, and do not require an extensive learning period for new users. The present invention also provides an efficient and user-transparent process of obtaining the address of a digital camera. Also, the present invention provides a method for efficiently administering a plurality of separate digital cameras.

Although the present invention is described in the context of a digital camera, it is not limited to this embodiment. Hence, the present invention does not provide only a limited degree of functionality as in the prior art applications; that is, it is not limited to either chat or video conferencing, or the like. As such, the present invention is capable of establishing a connection between any type of client system and remote device.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for allowing a client computer to remotely access a digital image capture unit via a communication network wherein a server computer system and said client computer system are communicatively coupled with communication equipment, said method comprising the steps of:

a) allowing said digital image capture unit to establish communication with said server computer system over said network, wherein said digital image capture unit includes connectivity software that enables said digital image capture unit to establish a network connection with said server computer system;

b) receiving an address of said digital image capture unit and registering said address in an executable program on said server computer system, wherein said digital image capture unit automatically registers said address with said server computer system;

c) allowing said client computer system to access said executable program on said server computer system; and d) establishing direct communication between said client computer system and said digital image capture unit by communicating commands between said client computer system and said digital image capture unit via said executable program, such that data captured by said digital image capture unit is transferred to said client computer system via said server computer system.

2. The method of claim 1 wherein said communication network is the Internet.

3. The method of claim 1 wherein said communication network is a Local Area Network.

4. The method of claim 1 wherein said image capture unit is a digital camera.

5. The method of claim 1 wherein step a) further comprises communicating authentication information between said digital image capture unit and said executable program.

6. The method of claim 1 wherein said executable program is a Java servlet.

7. The method of claim 1 wherein said executable program is a cgi-bin (Common Gateway Interface-binaries).

8. The method of claim 1 wherein step c) further comprises connecting said digital image capture unit to said server computer system via a Local Area Network.

9. The method of claim 1 wherein step c) further comprises connecting said digital image capture unit to said server computer system via an input/output port of said server computer system.

10. The method of claim 1 wherein step c) further comprises connecting said digital image capture unit to said server computer system via the Internet.

11. The method of claim 1 wherein step d) further comprises storing said commands in a memory unit of said server computer system and communicating said commands to said digital image capture unit at a time when a connection is made between said server computer system and said digital image capture unit.

12. The method of claim 1 further comprising the steps of:
  e) accessing via said executable program data acquired by said digital image capture unit; and
  f) transferring said data from said digital image capture unit to said client computer system via said server computer system.

13. The method of claim 12 further comprising storing said data in a memory unit of said server computer system and communicating said data to said client computer system at a time when a connection is made between said server computer system and said client computer system.

14. A computer system comprising:
  a processor coupled to a bus; and
  a memory unit coupled to said bus and having stored therein an executable program that when executed by said processor implements a method for allowing a client computer to remotely access a digital image capture unit via a communication network, said method comprising the steps of:
  a) allowing said digital image capture unit to establish communication with said server computer system over said network, wherein said digital image capture unit includes connectivity software that enables said digital image capture unit to establish a network connection with said server computer system;
  b) receiving an address of said digital image capture unit and registering said address with said executable program, wherein said digital image capture unit automatically registers said address with said server computer system;
  c) allowing said client computer system to access said executable program over said communication network; and
  d) establishing direct communication between said client computer system and said digital image capture unit by communicating commands between said client computer system and said digital capture unit via said executable program.

15. The computer system of claim 14 wherein said computer system is a server computer system.

16. The computer system of claim 14 wherein said digital image capture unit is a digital camera.

17. The computer system of claim 14 wherein said executable program is a Java servlet.

18. The computer system of claim 14 wherein said executable program is a cgi-bin (Common Gateway Interface-binaries).

19. The computer system of claim 14 wherein said digital image capture unit and said computer system are connected via a Local Area Network.

20. The computer system of claim 14 wherein said digital image capture unit and said computer system are connected via an input/output port of said computer system.

21. The computer system of claim 14 wherein said digital image capture unit and said computer system are connected via the Internet.

22. In a communication network comprising a server computer system and a client computer system communicatively coupled with communication equipment, a method for allowing said client computer to remotely access a digital camera via said communication network, said method comprising the steps of:
  a) allowing said digital camera to establish communication with said server computer system over said communication network, wherein said digital camera includes connectivity software that enables said digital camera to establish a network connection with said server computer system;
  b) receiving an address of said digital camera and registering said address in an executable program on said server computer system, wherein said digital camera automatically registers said address with said server computer system;
  c) allowing said client computer system to access said executable program on said server computer system;
  d) establishing direct communication between said client computer system and said digital camera by communicating commands between said client computer system and said digital camera via said executable program;
  e) accessing via said server computer system data acquired by said digital camera; and
  f) transferring said data from said digital camera to said client computer system via said server computer system.

23. The method of claim 22 wherein said executable program is a Java servlet.

24. The method of claim 22 wherein said executable program is a cgi-bin (Common Gateway Interface-binaries).

25. A method for allowing a client computer to remotely access a digital image capture device via a communication network wherein a server computer system and said client computer system are communicatively coupled with communication equipment, said method comprising the steps of:
  a) allowing said digital image capture device to establish communication with said server computer system over said communication network, wherein said digital image capture device includes connectivity software that enables said digital image capture device to establish a network connection with said server computer system;

b) receiving an address of said digital image capture device and registering said address in an executable program on said server computer system, wherein said digital image capture device automatically registers said address with said server computer system;

c) allowing said client computer system to access said executable program on said server computer system; and d) establishing direct communication between said client computer system and said digital image capture device by communicating commands between said client computer system and said digital image capture device via said executable program, such that data from said digital image capture device is transferred to said client computer system via said server computer system.

26. The method of claim 25 wherein said executable program is a Java servlet.

27. The method of claim 25 wherein said executable program is a cgi-bin (Common Gateway Interface-binaries).

* * * * *